US009198515B1

(12) United States Patent
Vanderhorst et al.

(10) Patent No.: US 9,198,515 B1
(45) Date of Patent: Dec. 1, 2015

(54) VERTICAL BACK SUPPORT HEALTH-ENHANCING DEVICE

(71) Applicants: Paul John Vanderhorst, Lithonia, GA (US); Christine Warner Vanderhorst, Lithonia, GA (US)

(72) Inventors: Paul John Vanderhorst, Lithonia, GA (US); Christine Warner Vanderhorst, Lithonia, GA (US)

( * ) Notice: Subject to any disclaimer, the term of this patent is extended or adjusted under 35 U.S.C. 154(b) by 0 days.

(21) Appl. No.: 14/629,656

(22) Filed: Feb. 24, 2015

Related U.S. Application Data

(62) Division of application No. 14/304,236, filed on Jun. 13, 2014, now Pat. No. 9,033,416.

(51) Int. Cl.
A47C 7/42 (2006.01)
A47C 7/44 (2006.01)
A47C 7/46 (2006.01)

(52) U.S. Cl.
CPC .. *A47C 7/46* (2013.01); *A47C 7/425* (2013.01)

(58) Field of Classification Search
CPC ............ A47C 7/46; A47C 7/467; A47C 7/42; A47C 7/425
USPC ................... 297/284.5, 284.6, 230.1, 230.11, 297/230.12, 230.13, 230.14
See application file for complete search history.

(56) References Cited

U.S. PATENT DOCUMENTS

| | | | | |
|---|---|---|---|---|
| 1,673,433 A | * | 6/1928 | Wheeler et al. | 297/230.13 |
| 2,077,233 A | * | 4/1937 | Greenhill | 267/117 |
| 3,103,219 A | * | 9/1963 | Chadner | 607/109 |
| 3,145,054 A | * | 8/1964 | Sopko, Jr. | 297/284.6 X |
| 3,305,878 A | * | 2/1967 | Hellbaum | 5/653 |
| 3,679,261 A | * | 7/1972 | Slabakov | 297/230.11 |
| 3,709,557 A | * | 1/1973 | Light | 297/230.12 |
| 3,856,349 A | * | 12/1974 | Light | 297/230.12 |
| 3,974,827 A | * | 8/1976 | Bodeen | 297/284.6 X |
| 4,189,182 A | * | 2/1980 | Rhoe | 297/452.32 |
| 4,335,725 A | * | 6/1982 | Geldmacher | 297/284.5 X |
| 4,362,334 A | * | 12/1982 | Ross et al. | 297/230.12 |
| 4,431,232 A | * | 2/1984 | Hannouche | 297/284.5 X |
| 4,471,993 A | * | 9/1984 | Watson | 297/284.5 |
| 4,516,568 A | * | 5/1985 | Baxter et al. | 297/230.14 X |
| 4,518,200 A | * | 5/1985 | Armstrong | 297/284.6 |
| 4,572,578 A | * | 2/1986 | Perkins | 297/452.32 |
| 4,597,386 A | * | 7/1986 | Goldstein | 297/230.13 X |
| 4,718,724 A | * | 1/1988 | Quinton et al. | 297/284.5 |
| 4,759,543 A | * | 7/1988 | Feldman | 297/284.6 X |
| 4,810,034 A | * | 3/1989 | Beier | 297/230.14 X |
| 4,862,536 A | * | 9/1989 | Pruit | 297/284.5 |
| 4,960,304 A | * | 10/1990 | Frantz | 297/284.6 |

(Continued)

*Primary Examiner* — Rodney B White

(57) ABSTRACT

An ergonomic back support device utilizing one or multiple vertical components that include layers (28,36), pressure distributing layers (34,38,50), and a single notched layer (48). These layers provide primary back support located behind and conforming to the Erector spinae muscles (124). The vertical components form an open channel (24) that is parallel to the prime neurological pathway of the spinal column (100). The vertical conforming support components and open channel facilitate physiological functions that promote health. The device accomplishes support without using any transverse, hard or continuous components across or against the back. Other embodiments include the following additional vertical components: a lateral pressure-adjusting device (14), heating layers (40,46), circulation stimulating layers (42,44), and massage layers (52,54). Embodiments include portable and permanently installed versions that can be utilized in the following applications, including, but not limited to, furniture, vehicles, trains, aircraft, boats, ships, and backpacks.

9 Claims, 12 Drawing Sheets

(56) References Cited

U.S. PATENT DOCUMENTS

| | | | | |
|---|---|---|---|---|
| 5,020,517 A | * | 6/1991 | Foster et al. | 297/284.1 X |
| 5,171,209 A | * | 12/1992 | Gamba | 602/13 |
| 5,190,347 A | * | 3/1993 | Shiow-Lan | 297/284.5 |
| 5,314,235 A | * | 5/1994 | Johnson | 297/284.5 |
| 5,433,505 A | * | 7/1995 | Coyne et al. | 297/230.14 X |
| 5,711,575 A | * | 1/1998 | Hand et al. | 297/284.6 |
| 5,785,669 A | * | 7/1998 | Proctor et al. | 297/284.6 X |
| 5,836,900 A | * | 11/1998 | Leventhal | 297/284.5 X |
| 6,220,663 B1 | * | 4/2001 | Benden et al. | 297/284.6 |
| 6,256,818 B1 | * | 7/2001 | Hughes | 5/639 |
| 6,588,020 B1 | * | 7/2003 | Stewart et al. | 2/94 |
| 7,055,199 B2 | * | 6/2006 | Thompson | 5/655.3 |
| 7,255,394 B2 | * | 8/2007 | Ogura | 297/284.5 X |
| 7,437,789 B2 | * | 10/2008 | Thompson | 5/655.3 |
| 7,513,002 B2 | * | 4/2009 | Best | 5/655.3 |
| 7,637,569 B2 | * | 12/2009 | Krobok et al. | 297/284.5 X |
| 8,261,384 B2 | * | 9/2012 | Batiste et al. | 297/230.1 X |
| 9,033,416 B1 | * | 5/2015 | Vanderhorst et al. | 297/284.5 |
| 2009/0236888 A1 | * | 9/2009 | Chew | 297/284.5 |
| 2012/0280546 A1 | * | 11/2012 | Hall | 297/284.5 |
| 2015/0080994 A1 | * | 3/2015 | Ho | 607/115 |

* cited by examiner

VERTICAL BACK SUPPORT HEALTH-ENHANCING DEVICE

CROSS-REFERENCE TO RELATED APPLICATIONS

Related Applications

This patent application is a Divisional of U.S. patent application Ser. No. 14/304,236, filed Jun. 13, 2014, patent pending, all of which is hereby incorporated by reference in its entirety.

FEDERALLY SPONSORED RESEARCH OR DEVELOPMENT (Not applicable)

REFERENCE TO SEQUENCE LISTING (Not applicable)

BACKGROUND a) Field
This application relates to the field of back support devices.
b) Description of Prior Art
Back support devices are well known in the art. However, prior art addresses only anatomical back support. No prior art addresses both anatomical back support and physiological functions of human health. Furthermore, all prior art utilizes transverse components across the back or continuous components that discomfort the spinous processes and obstruct human physiology by robbing energy from the user. Transverse and/continuous components impede neurological communication via biochemical and bioelectrical impulses, circulation, and reduce nutrient distribution along the prime neurological pathway of the spinal column and thus to all parts of the body. Current back supports compromise both mental and physical health and performance.

Back pain is the #1 complaint of seated persons. A Well.org survey reveals that 86% of Americans sit all day at work and 67% of Americans hate sitting. We are sitting up to 13 hours a day and it is wreaking havoc with our health. The Archives of Internal Medicine found that the risk of premature death grows 15 percent for those who sit eight hours a day! The risk increases 40 percent for those who sit 11 hours a day compared with those who sit just four hours. Too much sitting can increase the risk of obesity, diabetes, cardiovascular disease, and cancer. Since most people sit to do their jobs it is apparent that devices that mitigate deleterious effects of sitting and that facilitate mental and physical functions are needed.

Thus, there is a need for a back support device that reduces back pain. Since prior art only addresses anatomical back support generically, there is a great need for a product that addresses anatomical, physiological issues with new technology.

The Applicants Vertical Back Support Health-Enhancing Device addresses improving anatomical alignment, facilitating physiological functions with new technology utilizing physical features in novel configurations, sizes, orientation, combinations, and arrangements. This new technology supports the back, optimally aligns the spine, facilitates physiology by improving neurological communication throughout the body, returns energy back to users and thus address a never before considered set of human comfort and performance issues. This novel physical composition is not expressly suggested nor implied in prior art. Furthermore, these physical features utilized in a novel way work synergistically to produce important, significant, unexpected, and valuable results including supporting the back and optimally aligning the spine, improving rib head articulation, optimizing intervertebral disk spacing and foramina openings, whereby an unimpeded neurological pathway along the spine enhances health, increases performance and returns energy to the user. These physical features include uniquely formed vertical components that conform to the Erector Spinae muscles that also form an open channel that aligns with the spine. The vertical components provide primary support of the back along the muscles that erect and shape the back. The open vertical channel divides support components and enables freer flow of nerve impulses and blood flow along the prime pathway of the spinal column. Another physical feature is a lateral pressure-adjusting device located behind vertical components that enables users to shape vertical components to optimally align the spine. Thus, there are no hard, transverse, or continuous components directly against the back that impede neurological communication. This novel physical support system produces new and unexpected results. It facilitates essential human physiological functions, particularly neurological communication via biochemical and bioelectrical impulses, blood flow and cellular transfer along the prime back pathway of the human spine in the open channel created by the vertical components. It improves neurological communication to all other parts of the anatomy and facilitates physiological functions. Improved communication between the brain (the control center of the body) and all organs, muscles, and physiological systems throughout the body increases energy to the user, enhances overall health and wellness, and increases capacity for performing mental and physical tasks. The Applicants Vertical Back Support Health-Enhancing Device solves the problem of stolen energy that was never before even recognized and provides an advantage which never before was appreciated. It solves a long-felt, long-existing and unsolved need to return energy back to a seated person that is stolen by all prior art. Furthermore, the results of enhanced mental and physical performance are greater than the sum of the results of prior art.

The Applicants Vertical Back Support Health-Enhancing Device is unobvious. It addresses anatomical alignment, physiological functions with novel physical technology applied in unique ways. If this novel design to solve the #1 complaint of seated humans was obvious it would have been done by now. The fact that it was not even described nor suggested in prior art, and it does not exist in prior art proves that it is unobvious.

c) Patent Search
Patent searches were conducted in Field of Classification Search USPC . . . 297/440.22, 284.1, 284.4, 284.5, 652, 657, 230.13, 230.14; 5/652. None was found to be similar to our embodiment.

Patent searches were also conducted using key words listed in the numbered categories below. Patents closest to our embodiment were examined in detail and explanations describing why they are different from our embodiment are included in the following category subsets.
For example: 1. 'Category'. 1.1 Category subset.
1. 'Vertical back supports'—3 patents found.
    1.1. U.S. Pat. No. 5,407,210-Portable game apparatus for playing curb ball or other ball game. Not related to our embodiment. It has nothing to do with supporting the back.

1.2. U.S. Pat. No. 4,539,722-Sofa-bed-dining table combination. Not related to our embodiment. It has nothing to do with supporting the back.
1.3. U.S. Pat. No. 4,488,752-Expandable mobile trailer. Not related to our embodiment. It has nothing to do with supporting the back.
2. 'Spinal support'—361 found; none support the spine utilizing the unique technology in our patent.
3. 'Back supports with channels'—0 found.
4. 'Back supports for vertical muscle groups'—0 found.
5. 'Energizing back supports'—0 found.
6. 'Posture correction devices'—1 found. Not related.
7. 'Back rests'—720 found; 1 was remotely similar and 1 was similar. Both are included in the table below.
8. 'Back supports'—1029 found; 3 were remotely similar and are included in the table below.
9. 'Back support devices'—40 found; 1 was remotely similar and is included in the table below.

The patent search found five patents that were remotely similar and one that was similar. All six are listed in the table below. Explanations of how they differ from our embodiment are itemized below the table.

| U.S. patent DOCUMENTS | | |
|---|---|---|
| U.S. Pat. # | Date | Inventor(s) |
| 6,496,994 | Dec. 24, 2002 | Omel |
| 6,331,170 | Dec. 18, 2001 | Ordway |
| 5,054,854 | Oct. 18, 1991 | Pruitt |
| 7,001,350 | Feb. 21, 2006 | Grosso |
| 6,805,680 | Aug. 30,2001 | Klinger; Knud |
| 4,572,578 | Aug. 8,1984 | Perkins |

U.S. Pat. No. 6,496,994—Back Support. The rectangular expandable bladder provides one transverse component that presses against the back and is perpendicular to the spinal column, in the lumbar region, which impedes human physiological functions and health.

U.S. Pat. No. 6,331,170—Adjustable back support. A belt secures an inflatable back support that provides one transverse component that presses against the back and is perpendicular to the spinal column in the lumbar region, which impedes human physiological functions and health.

U.S. Pat. No. 5,054,854—Inflatable structure secured by tension. One or multiple bladders support the back with transverse components that press against the back and are perpendicular to the spinal column, which impedes human physiological functions and health.

U.S. Pat. No. 7,001,350—Portable, inflatable lumbar cushion. A belt secures an inflatable back support that provides a transverse component that presses against the back and is perpendicular to the spinal column, in the lumbar region, which impedes human physiological functions and health.

U.S. Pat. No. 6,805,680—Method for providing a massage on seats, and a device for implementing this method. This device massages the back with multiple transverse components that press against the back and are perpendicular to the spinal column across the entire back, which impedes human physiological functions and health.

U.S. Pat. No. 4,572,578—Back rest. This patent is most similar. However, there are several ways in which it is different. U.S. Pat. No. 4,572,578 is a 'back rest'. THE VERTICAL BACK SUPPORT HEALTH-ENHANCING DEVICE is a 'back support'. U.S. Pat. No. 4,572,578 provides a back rest that supports and also restricts movement from the cervical to the sacral vertebrae. THE VERTICAL BACK SUPPORT HEALTH-ENHANCING DEVICE supports the back from the thoracic to the sacral vertebrae and allows free movement of the cervical vertebrae. U.S. Pat. No. 4,572,578 has a kidney support. THE VERTICAL BACK SUPPORT HEALTH-ENHANCING DEVICE does not have a kidney support. U.S. Pat. No. 4,572,578 is not adjustable. THE VERTICAL BACK SUPPORT HEALTH-ENHANCING DEVICE is adjustable both vertically and horizontally to improve support and comfort. U.S. Pat. No. 4,572,578 is not available in various sizes to fit a variety of human torso lengths. THE VERTICAL BACK SUPPORT HEALTH-ENHANCING DEVICE is available in various sizes to fit various torso lengths. U.S. Pat. No. 4,572,578 is made of non-adjustable foam. THE VERTICAL BACK SUPPORT HEALTH-ENHANCING DEVICE is made of a variety of adjustable and flexible materials including plastics, foam, pneumatic bladders, polyester, nylon, and gelatinous substances.

The following patents presented by the Examiner and have been successfully defended to the Examiners satisfaction showing that the Applicants embodiment is novel over Leventhal (U.S. Pat. No. 5,836,900, Shiow-Lan (U.S. Pat. No. 5,190,347) and Quinton et al (U.S. Pat. No. 4,718,724), and Stewart, III et al (U.S. Pat. No. 6,588,020 B1) as evidenced by receiving Notice of Allowance mailed Feb. 15, 2015 of Provisional Parent Application No. 61/884,050 and Non-Provisional patent application Ser. No. 14/304,236.

Office Action Claims rejections under 35 USC 102, 35 USC 103 and 35 USC 112 have been successfully overcome by the Applicant to the satisfaction of the Examiner as evidenced by receiving Notice of Allowance mailed Feb. 15, 2015 of Provisional Parent Application No. 61/884,050 and Non-Provisional patent application Ser. No. 14/304,236.

BRIEF SUMMARY

An improved ergonomic back support device utilizing one or multiple vertical components arranged in two columns that provide primary back support located behind and conforming to the Erector spinae muscles, which form an open channel parallel to the spinal column without using any transverse, hard, or continuous components across or against the back.

BRIEF DESCRIPTION OF THE SEVERAL VIEWS OF THE DRAWINGS

Better understanding of this back support will become apparent, including its function in harmony with human anatomy and objects other than those set forth above, in the following detailed description. This description refers to the following drawings.

REFERENCE NUMERALS

Figure 1:
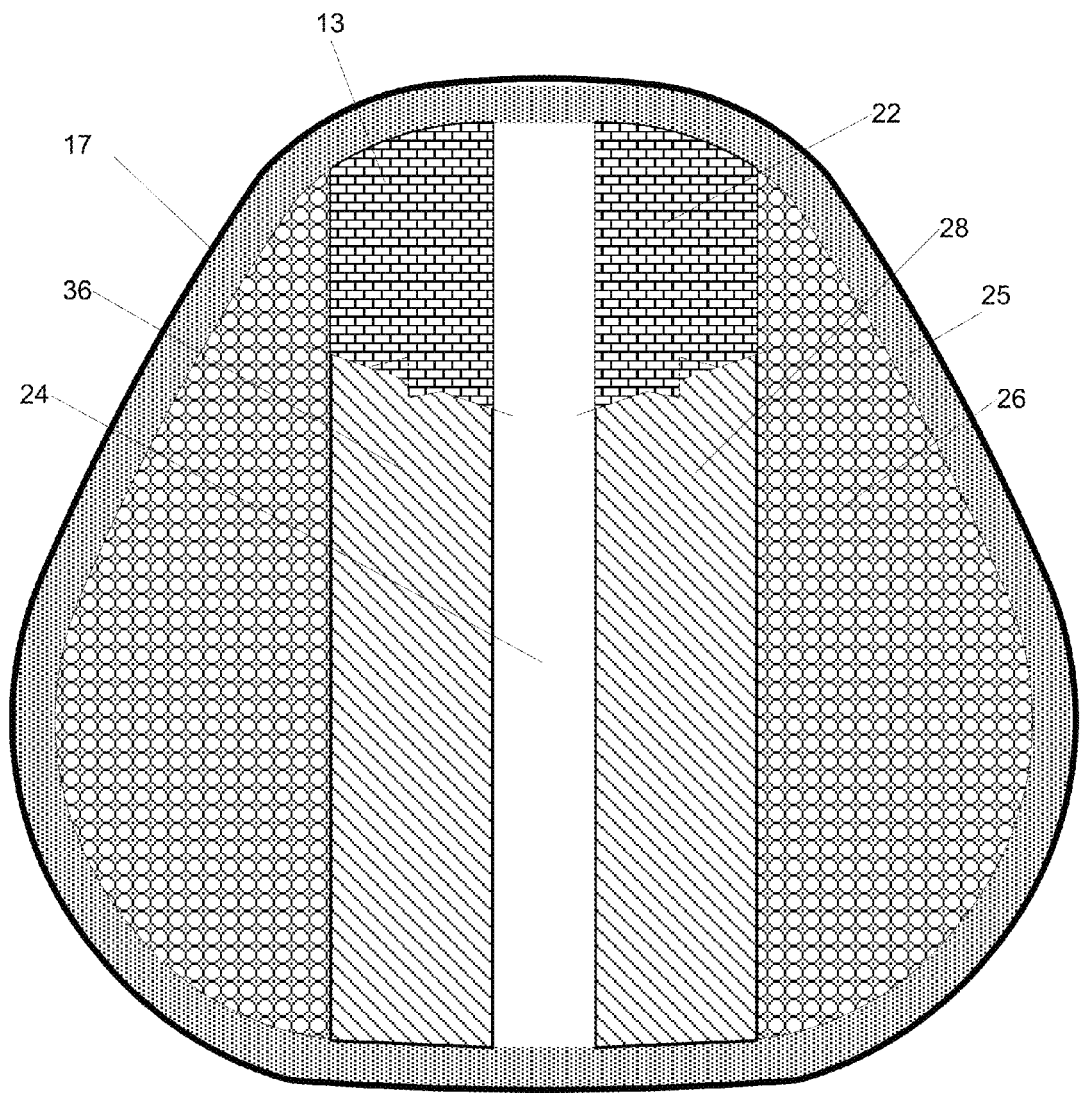
FIG. 1 is a posterior view of a portable embodiment showing multiple vertical components, and a frame with stretchable material.
Figure 2:
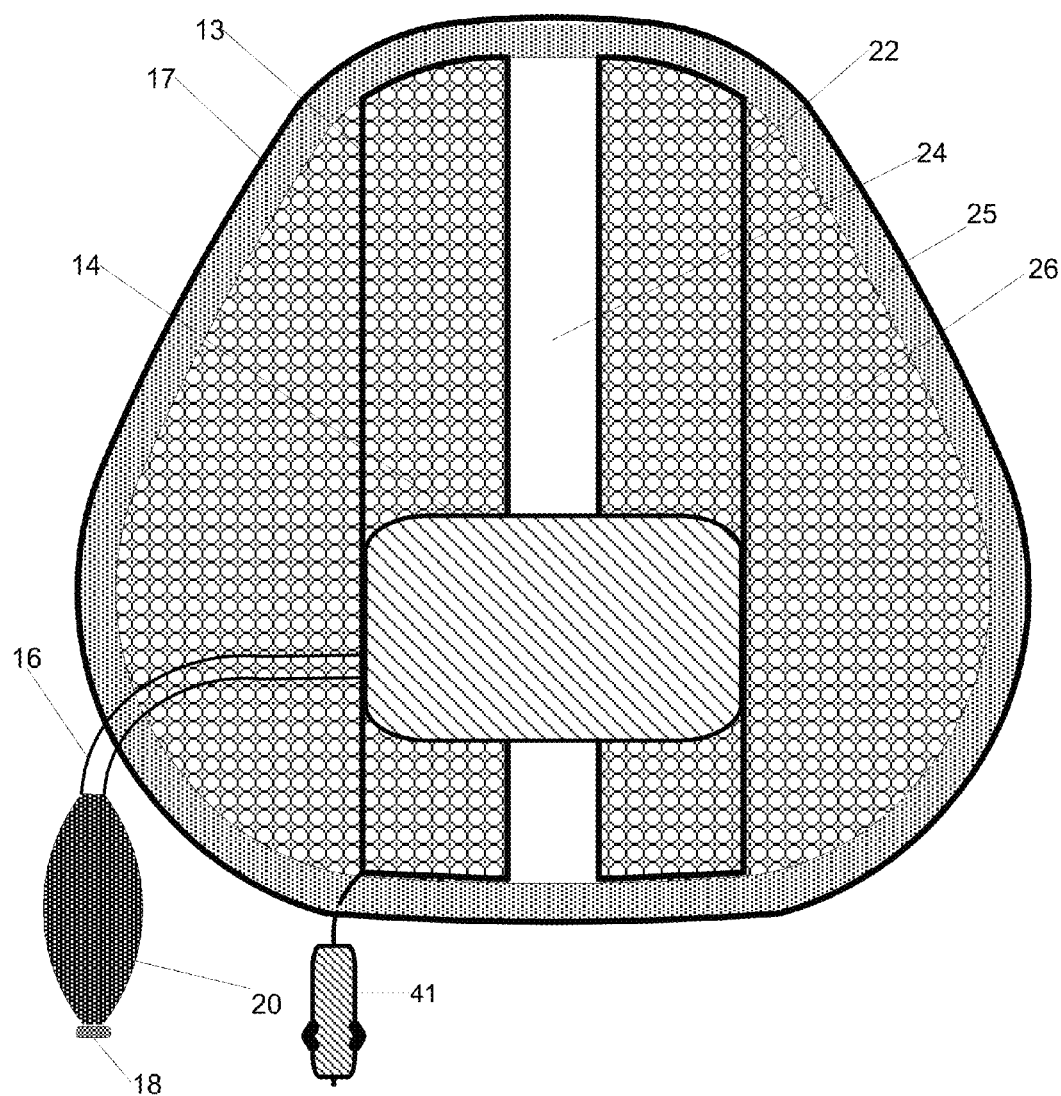
FIG. 2 is a posterior view of a portable embodiment showing multiple vertical components, a frame with stretchable material and additional components including a lateral pressure-adjusting device with controls, and a power plug and chord.
Figure 3:
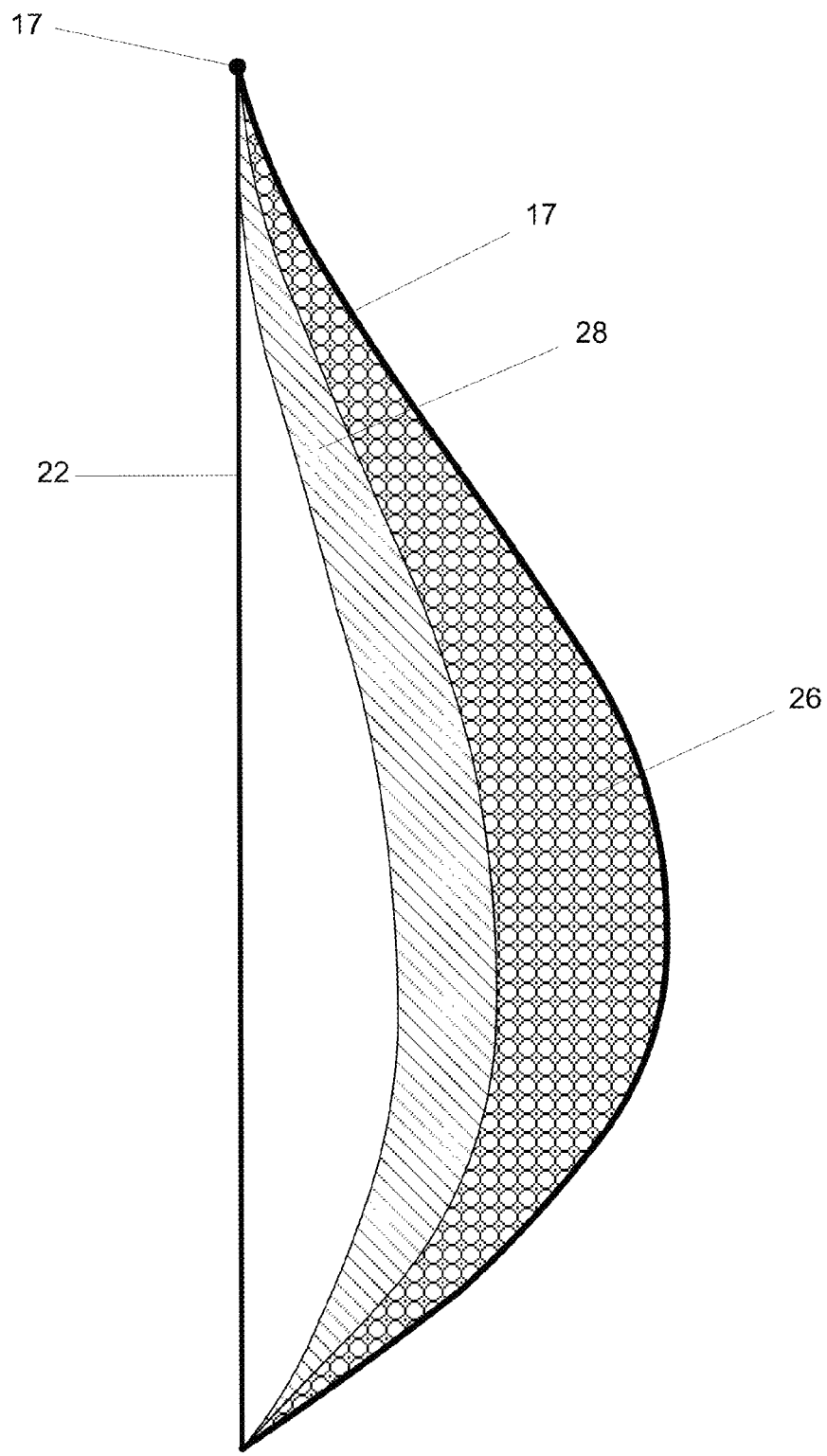
FIG. 3 is a lateral (side) view of a portable embodiment showing the frame with stretchable material, and two of the multiple vertical components.
Figure 4:
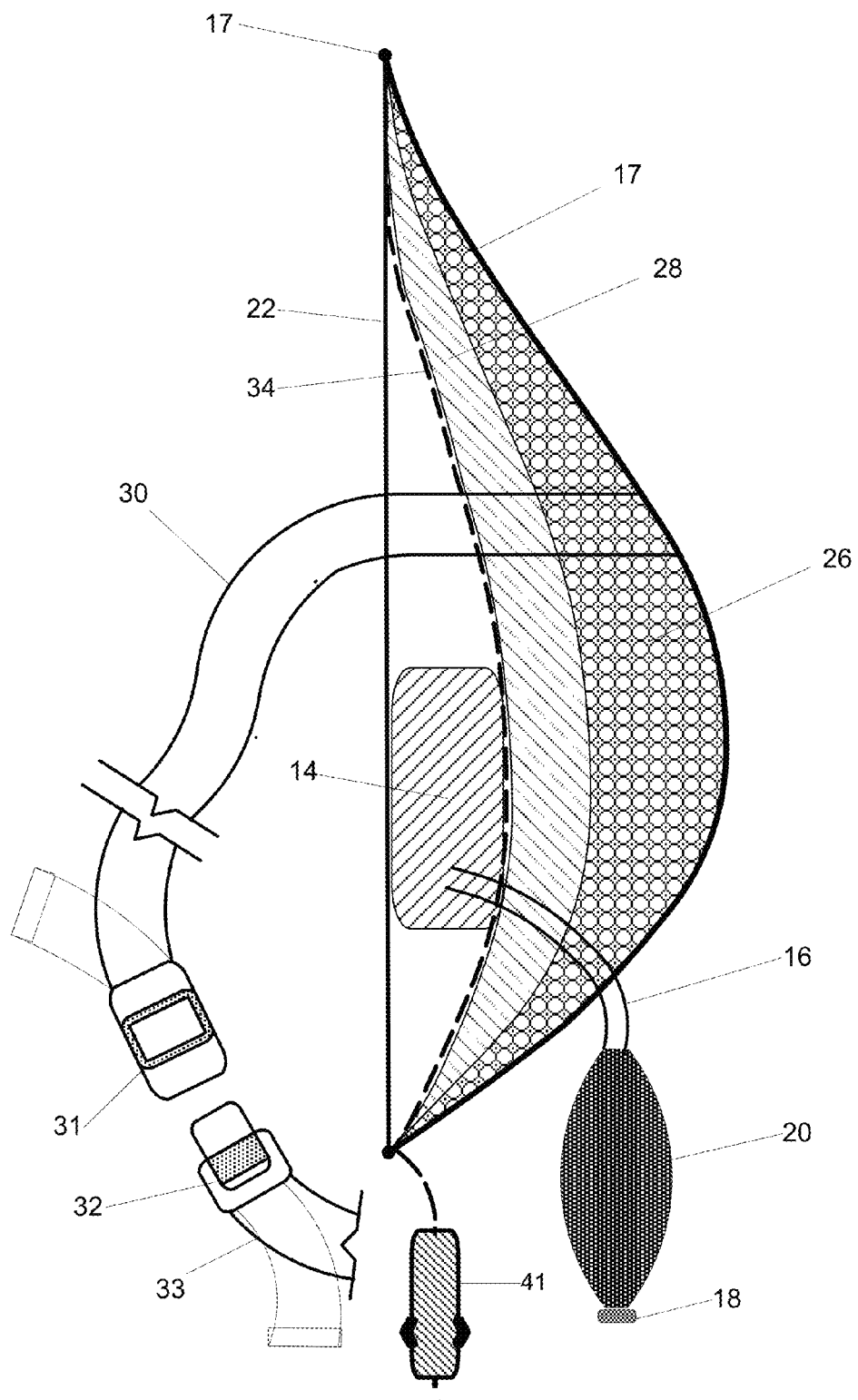
FIG. 4 is a lateral (side) view of a portable embodiment showing the frame with stretchable material, several additional vertical components, and other components including a lateral pressure-adjusting device, and a securing belt and a buckle.

13 Left rear strap
17 Frame
14 Lateral pressure-adjusting device
15 Lateral pressure-adjusting device envelope
16 Tube
18 Control valve
20 Pump
22 Right rear strap
23 Center rear strap
24 Open channel
25 Finishing edge
26 Stretchable material
28 Right vertical conforming layer
30 Right belt
31 Right buckle
32 Left buckle
33 Left belt
34 Right vertical pressure distributing layer
35 Left vertical conforming layer envelope
36 Left vertical conforming layer
38 Left vertical pressure distributing layer
40 Left vertical heating layer
41 DC plug
42 Left vertical stimulating layer
43 Right vertical heating layer/massage belt slip surface
44 Right vertical stimulating layer
45 Right vertical conforming layer envelope
46 Right vertical heating layer
47 Single vertical notched conforming layer envelope
48 Single vertical notched conforming layer
49 Left vertical heating layer/massage belt slip surface
50 Single vertical pressure distributing layer
51 Right top pulley
52 Left massage belt
54 Right massage belt
61 Pressure plate
62 Top support arm
63 Bottom support arm
64 Piston mechanism
68 Motor
69 Motor pulley
70 Drive belt
71 Heat control button
72 Motor power wire
73 Lateral pressure adjusting device button
74 Heat layer wire
75 Motor control button
76 Lower pulley shaft
78 Upper pulley shaft
80 Left top pulley
82 Left bottom pulley
84 Right bottom pulley
86 Exploded diagram—Cross-section 1
88 Exploded diagram—Cross-section 2
90 Exploded diagram—Cross-section 3
100 Spinal column
101 Vertebral categories
102 Cervical vertebrae
104 Thoracic vertebrae
106 Lumbar vertebrae
108 Sacral vertebrae
110 Coccyx vertebrae
112 Spinalis muscle
114 Longissimus muscle
116 Illiocostalis muscle
118 Foramen
120 Intervertebral disk
122 Spinous process
124 Erector spinae
126 Outline of human back
128 Vertebra cross-section
130 Spinous process—alternate position

DETAILED DESCRIPTION a) Glossary of Terms

For examination convenience the following glossary of terms used are provided in compliance with 608.01(g).
1. Anatomy—is the science of the morphology of the human body. Human Anatomy (the structure), human physiology (the function), and biochemistry (the chemistry of living structures) are complementary basic medical sciences.
2. Anterior—situated before or toward the front. (anterior view is a front view)
3. Aorta—The large arterial trunk that carries blood from the heart to be distributed by branch arteries through the body.
4. Articulation—a joint or juncture between bones or cartilages in the skeleton of a vertebrate
5. Back Support Device—an all-encompassing term to include seating systems, chairs, seats, furniture, back supports, lumbar supports, posture correction systems, sitting supports and other devices and all methods of aiding and assisting the human body in maintaining and operating in the sitting or seated position through direct pressure in any degree upon one or all areas of the back.
6. Bioelectrical—of or relating to electric communication in living organisms. (see neurological communication and electrochemical).
7. Biochemical—characterized by, produced by, or involving chemical reactions and communication in living organisms. (see neurological communication and electrochemical).
8. Biomechanical—a physical device which is designed and built to improve anatomy and to facilitate physiological functions with assistance from an external mechanical assistance.
9. Circulatory System—The circulatory system is a system that permits blood and lymph circulation to transport nutrients (such as amino acids and electrolytes, oxygen, carbon dioxide, hormones, blood cells, food and fuel) to and from cells in the body to nourish it and to help fight diseases, stabilize body temperature and pH, and to maintain homeostasis.
10. Electrochemical—the combination of bioelectric and biochemical communication. Electrochemical transmission defines all the individual and aggregate communication of cells comprising the complete anatomy and physiology of the human body.
11. Erector spinae 124—a muscle group of the back, which extends the vertebral column. It is a bundle of three muscles; the spinalis 112 most medially, the longissimus 114 in the center, and iliocostalis 116 laterally. They are paired and lie vertically on both sides of the Spinous process of the vertebrae.
12. Foramina 118 (snglr. Foramen) The vertebral foramina constitute a canal for the protection of the medulla spinalis (spinal cord). Between each pair of vertebrae are two apertures (openings), the intervertebral foramina (singular: foramen); also called neural foramina. The foramen allows for the passage of the spinal nerve root, dorsal root ganglion, the spinal artery of the segmental artery, communicating veins between the internal and external plexuses, recurrent meningeal (sinu-vertebral) nerves, and transforaminal ligaments. Foramen size is variable due to placement, pathology, spinal loading, subluxation and posture. They can be occluded by arthritic degenerative changes and space-occupying lesions like tumors, metastases and spinal disk herniations. Cervical, thoracic, and lumbar vertebrae all have intervertebral foramina.
13. Health—the condition of being sound in body, mind, or spirit; especially: freedom from physical disease or pain.
14. Homeostasis—a relatively stable state of equilibrium or a tendency toward such a state between the different but interdependent elements or groups of elements of an organism, population, or group. In this state, all anatomical and physiological systems of the organism function in harmony creating health and wellness.
15. Inferior vena cava—a vein that is the largest vein in the human body, formed by the union of the two common iliac veins at the level of the fifth lumbar vertebra, and returns blood to the right atrium of the heart from bodily parts below the diaphragm. It is posterior to the abdominal cavity and runs alongside of the vertebral column on its right side.
16. Intervertebral disk 120—any of the tough elastic disks that are interposed between the centra of adjoining vertebrae and that consist of an outer fibrous ring enclosing an inner pulpy nucleus.
17. Intervertebral disk space—typically defined on an X-ray photograph as the space between adjacent vertebrae.
18. Lateral view—a side view. A view from the side.
19. Lateral pressure-adjusting device 14—objects including, but not limited to, air bladders, gel bladders, and any other form of flexible, adjustable, conforming, enlarging or minimizing components.
20. Lateral Spinal Alignment—is how the spine is aligned from a side view.
21. Optimal Lateral (side) Spinal Alignment FIGS. 8,9,11—Optimal alignment of the spinal column from a lateral (side) view that creates optimal intervertebral and foramina spacing. Optimum posture of the spinal column is composed of a series of reverse compound curves (serpentine curves). Optimal alignment best facilitates human physiology.
22. Matter—the substance of which a physical object is composed. A material substance that occupies space, has mass, and is composed predominantly of atoms consisting of protons, neutrons, and electrons, and that is interconvertible with energy.
23. Neurological—relating to the physiology of the nervous system. Neuroscience that includes electrophysiological recordings as well as some of the common tools of molecular biology. Of particular relevance to this embodiment is that neurons transmit signals both electrically and chemically. In other words bio-electrically and biochemically, (I.E. electrical and chemical energy created by the biology of living organisms).
24. Neurological pathway—are the network of the nervous systems impulses throughout the body. The prime neurological pathway is along the spine wherein occurs bioelectric and biochemical communication between the brain and all parts of the body through the spinal vertebrae.
25. Neurological communication communication between neurons (i.e. nerve impulses). Occurs in the form of electrochemical (bioelectric and biochemical) transfer of energy signals.
26. Morphology—a branch of biology dealing with the study of the form and structure of organisms and their specific structural features.
27. Musculature System of the Back—The musculature system of the back includes the Erector spinae muscles that are a muscle group which extends the vertebral column. It is a bundle of three muscles; the spinalis most medially, the longissimus in the center, and iliocostalis laterally. They are paired and lie vertically on both sides of the Spinous process of the vertebrae. These three muscles extend throughout the lumbar, thoracic and cervical regions, and are situated in the void to each side of the Spinous processes and posterior to the vertebral column. This large muscular and tendinous mass varies in size and structure at different parts of the vertebral column. In the sacral region it is narrow and pointed. In the lumbar region it is larger, and forms a thick fleshy mass which, on being followed upward, is subdivided into three columns; these gradually diminish in size as they ascend to be inserted into the vertebra and ribs. A simplified graphic of the Erector spinae is presented in FIG. 5). The spinal vertebrae collectively form the Spinal Column which is the body's largest neurological (bioelectric and biochemical) pathway. In Eastern Medical nomenclature the spinal column is the Back Pathway of the Prime Energy Meridian.

28. Physiology—the science of the neurological, bioelectrical and biochemical (electrochemical) communications, mechanical systems, physical systems, organ systems, and the cells of which they are composed. Physiology focuses principally at the level of organs and systems. Anatomy and physiology are closely related fields of study: anatomy, the study of form, and physiology, the study of function, are intrinsically related.

29. Posterior—near or toward the back of something (Posterior view is a back view)

30. Rib Heads—are the ends of a rib closest to the vertebral column, with which it articulates.

31. Spinal Cord and Neurons—The spinal cord extends through hollow openings in each vertebra in the back. It contains various nerve cell bodies (gray matter) and nerve processes or axons (white matter) that run to and from the brain and outward to the body. The peripheral nerves enter and exit through openings in each vertebra. Within the vertebra, each nerve separates into dorsal roots (sensory nerve cell processes and cell bodies) and ventral roots (motor nerve cell processes). The autonomic nerve cell bodies lie along a chain that runs parallel with the spinal cord and inside the vertebrae, while their axons exit in the spinal nerve sheaths. The brain, spinal cord and nerves consist of more than 100 billion nerve cells, called neurons. Neurons gather and transmit electrochemical signals. They have the same characteristics and parts as other cells, but the electrochemical aspect lets them transmit signals over long distances (up to several feet or a few meters) and pass messages to each other. The spinal cord has three major functions: as a conduit for motor information, which travels down the spinal cord, as a conduit for sensory information in the reverse direction, and finally as a center for coordinating certain reflexes.

32. Spinal column 100—the column of spinal vertebrae. It is the primary pathway along which the body's vital neurological signals transmit (bioelectrical & biochemical communication).

33. Spinal vertebrae 101—The Spinal vertebrae consist of 5 groups; the cervical 102, thoracic 104, lumbar 106, sacrum 108 and coccyx 110. In human anatomy, the vertebral column usually consists of 24 articulating vertebrae, and nine fused vertebrae in the sacrum and the coccyx. It is situated in the dorsal aspect of the torso, separated by intervertebral disks. It houses and protects the spinal cord in its spinal canal, and hence is commonly called the spine, or simply backbone. There are normally 33 vertebrae in humans, including the five that are fused to form the sacrum (the others are separated by inter vertebral disks) and the four coccygeal bones that form the tailbone. In the proper anatomical position for health and wellness the spine aligns in reverse compound curves, or serpentine curves.

| CATEGORIES OF SPINAL VERTEBRAE: | | | |
|---|---|---|---|
| Spinal vertebrae | # of Vertebrae | Body Area | Abbreviation |
| Cervical | 7 | Neck | C1-C7 |
| Thoracic | 12 | Chest | T1-T12 |

-continued

| CATEGORIES OF SPINAL VERTEBRAE: | | | |
|---|---|---|---|
| Spinal vertebrae | # of Vertebrae | Body Area | Abbreviation |
| Lumbar | 5 or 6 | Low Back | L1-L5 |
| Sacrum | 5 (fused) | Pelvis | S1-S5 |
| Coccyx | 3 (fused) | Tailbone | None |

34. Spinous process 122—a bony projection off the posterior (back) of each vertebra. The spinous process protrudes where the laminae of the vertebral arch join and provides the point of attachment for muscles and ligaments of the spine. Spinous processes are the ridges that can be felt through the skin along the back of the spine.

35. Subluxation—partial dislocation (as of one of the bones in a joint including vertebral misalignment in the spinal column) that often causes nerves to be pinched which impedes neurological communication.

DETAILED DESCRIPTION b) Detailed Description & Explanation

The following embodiments are at are presently contemplated. However, other configurations, lamination order, values, sizes, frame and vertical component shapes, and materials etc. can be used.

This embodiment enables improved posture in a unique way by primarily supporting the Erector spinae muscles of the back in the thoracic, lumbar, and sacral regions utilizing one or multiple vertical components arranged in two columns. The two columns create an open back channel along the spine that facilitates vital neurological communication, nutrient distribution and cellular flow which in turn enhances users' health, energy, and performance.

Improved spinal alignment creates improved intervertebral disk spacing and intervertebral foramina openings that facilitate intra-cellular and inter-cellular electrochemical communication, cellular flow, and nutrient distribution along the prime neurological spinal column pathway and to all parts of the body. Improved anatomical posture also helps prevent vertebral and rib-head subluxation that impedes neurological communication Additional explanations follow in three categories:
1. Human Anatomy and Physiology
2. Human Health and Performance Problems
3. How This Embodiment Mitigates Human Health & Performance Problems 1. Human Anatomy and Physiology Atoms are one of the smallest units of energy. Humans are composed of atoms that form matter called cells. Cells combine to form matter of bones and flesh, organs and systems; together they comprise the anatomy and physiology of the human body.

Cells are the power plants of human bodies, the furnaces that create internal energy. The autonomic nervous system communicates information via biochemical and bioelectrical signals at intra-cellular and inter-cellular levels that help maintain and balance physiological functions. The average human body has an estimated 100 trillion (1,000,000,000,000) cells. Unimpeded physiological functions in the spinal pathway are vital in creating optimum health and peak performance for the 100 trillion cells in the body, and for the whole person. At the cellular level, there are streams of energy and information that flow constantly. The human body communicates within itself on both inter-cellular and intra-cellular levels, independent of the brain, via electrochemical signals. These signals transmit throughout the body from the control center in the brain through the brain stem (the spinal column) to the rest of the human anatomy and physiology. Properly functioning physiology energizes humans, which improves both mental and physical performance.

Human physiological systems include the following: nervous, cardiovascular, digestive, respiratory, endocrine, integumentary, lymphatic, skeletal, urinary, reproductive and muscular. Compromised physiological systems degrade health and performance. This embodiment facilitates human physiological functions and thus 'returns' energy back to the user that, in the some cases of seated persons, is blocked by poorly designed back rests, horizontal lumbar supports and poor posture. Thus, users of this embodiment can feel and have more energy.

The circulatory system transports essential nutrients through the primary spinal pathway. Existing lumbar back supports position horizontal (transverse) components that press against the back and are perpendicular to the back, thus they obstruct, block and prevent the natural and healthy flow of nutrients, cells, and electrochemical communication through the vertical back pathway of the spinal column.

Optimum spinal alignment creates optimum inter-vertebral disk spacing and intervertebral foramina openings that facilitate maximum intra-cellular and inter-cellular electrochemical communication, cellular flow, and nutrient distribution along the primary spinal column pathway to all parts of the body.

Compromised anatomical structure and physiological functions impair physical performance and reduces mental acuity. Optimal spinal alignment, both from an anterior/posterior view and from a lateral view, facilitates efficient transmission and distribution of nerve impulses along the primary neurological pathway of the spinal column. Cells transport and transmit nerve impulses, amino acids, electrolytes, oxygen, carbon dioxide, hormones, blood, nutrients and a literal host of other chemicals, nutrients and wastes that the body produces and delivers them to various parts of the body for processing, metabolism, filtration, elimination, and to fight viral, bacterial, and a variety of microscopic invaders. Electrochemical transmission defines all the individual and aggregate communication of cells comprising the complete anatomy and physiology of the human body. This embodiment improves spinal alignment, which facilitates electrochemical transmission and distribution of vital neurological information and signals.

Neurological communication flows from the brain through the spinal column to all parts of the body. The spine is the most important neurological pathway. It is the 'freeway' to which all secondary 'roads' are connected. This embodiment facilitates neurological communication along the spinal pathway. When all systems are functioning properly, people have more energy, less fatigue, better health, and overall wellness and they can perform to their peak level.

Blood distribution through the circulatory system flows from the Aorta and connecting arteries to the Inferior vena cava that serves the Spinal vertebrae and the Erector spinae muscles. Circulation in these conduits is the 'headwaters' of circulation throughout the body. Cells transported via the circulation system should flow uninhibited for other physiological systems to function optimally and provide nutrients to the body. Any impeding of flow compromises bodily functions and reduces well-being and energy. This embodiment improves spinal alignment and thus facilitates flow in this vital 'headwaters' area of the blood circulation system through the spinal column and from there throughout the body.

Subluxation impairs neurological communication and proper physiological functions of the body. Subluxation reduces the space between joints, including vertebrae that pinch nerves and blood vessels thus interrupting neurological signals and restricting blood flow and nutrient distribution from the brain through the spine to all parts of the body. Subluxation of vertebrae and rib head articulation with the Spinal vertebrae are common ailments. Sitting, especially over long periods, exacerbates subluxation. Consequences of subluxation include fatigue, weakness, illness, nutrition blockage, disease, and poor performance. Poor posture (rounded shoulders and concave spinal column) contributes to vertebrae subluxation. This embodiment helps prevents and correct subluxation.

Poor posture impedes inter-cellular communication, nutrient flow and neurological signal transfer. It can cause low energy, pain, and discomfort that can exacerbate into serious medical issues. These issues include a host of physical illnesses and diseases, such as but not limited to, fatigue, indigestion, heart malfunction, compromised kidney, gall bladder and liver functions, muscle aches, compromised immune system, and poor circulation. Compromised homeostasis of bio-electrical and biochemical communication is a root cause of many physical ailments.

Poor posture impedes vertical physiological functions along the spinal pathway. Concave and straight-backed seatback rests both impair physiological functions. Concave backrests (typical couches and many chair backrests) bend Spinal vertebrae in an unhealthy forward concave position that can restrict nerve transmission, blood flow and compromise health and wellness. Straight backrests support the upper thoracic vertebrae but cause the lower thoracic, lumbar and upper sacral vertebrae to slouch in a concave position in order to 'fit' the straight form of the back rest. In addition to being uncomfortable, this poor anatomical position of the spine also impairs vertical physiological and electrochemical functions throughout the body.

2. Human Health and Performance Problems

Lower back pain is one of the most common ailments of humankind.

Many modern jobs and other activities are performed while seated. Job related tasks and activities performed while seated include, but are not limited to, the following; document composition and reviews, assembly line work, computer work and gaming, operating equipment, entertainment center viewing, operating drones, watching movies in theaters, sitting in meetings, air traffic controlling, attending concerts, and driving or riding in vehicles including cars, busses, trains, planes, and submarines, etc. and worse yet, each of these activities may occur over an extended period of time, rendering the sitting position almost unbearable.

Sitting in a poorly designed chair or against the poorly designed backrest can put enormous stress on the body. The human body is designed for standing and moving, not sitting. There are multiple stresses caused by the seated position. In the seated position, the entire weight of the torso is balanced on the ischial tuberosities of the pelvic bones. Constant muscle activity is necessary to maintain an upright posture while seated and while leaning against a poorly designed backrest. This muscle activity requires energy. Chemical conversion of blood sugar and supplied to muscles via the circulation system creates energy. Lactic acid is one by-product of this muscle activity, which if not dissipated from the muscles, builds up and causes pain, muscle spasm, and fatigue.

Sitting typically causes the pelvis to rotate and the lumbar vertebrae to straighten or concave toward the posterior. Sitting in this position also compromises the spines' equilibrium and disrupts homeostasis. Sitting in this position causes spinal muscles to work harder which greatly increases static muscle work. Eventually muscles fatigue causing discomfort and spasms. Flattening or concaving of the lower back causes sacral, lumbar and lower thoracic vertebrae to compress anteriorly and open up posteriorly. Prolonged sitting causes the gel-like fluid inside the disks to migrate posteriorly, which can cause subluxation of the vertebrae and impairment of neurological communication. Long-term sitting in this position can cause disks to herniate and rupture which may require surgery. Protruding disks can cause lower backache that leads to pain radiating down the legs in the form of sciatica and other numbness, which causes loss of muscle function and mobility. Sitting in this position causes the anterior portion of intervertebral disks in the lumbar region to compress.

Sitting also places the spine and legs at 90 degrees +/- and constricts blood circulation and nutrient distribution through vessels in the pelvic region, thus interfering with all physiological functions.

Sitting with the back against almost all types of current, common or typical chairs, seat backs and back supports fail to properly align the spine. Thus, they impede, and obstruct the flow of neurological communication along the spine (the governing back pathway of the primary energy meridian in Eastern medical terminology). Consequently, fatigue, back pain, reduced strength, mental sluggishness, and low energy are common aliments for seated humans.

Most backrests encourage poor posture by allowing the spine to bend in a concave position from the lateral (side) point of view. Poorly designed seatbacks typically cause the spine to form a concave "C" from a lateral (side) view, which tends to subluxation of vertebrae on the anterior side and impedes the natural flow of nutrients and nerve impulses up and down the spinal column. A concaved spinal curve improperly aligns vertebrae, which impedes neurological signal transmission that often causes discomfort, fatigue and pain. Typically, humans 'alleviate' this problem by occasionally standing and stretching the spine to relieve the built-up stress. The root cause of most discomfort, fatigue, and pain is impaired flow of electrochemical communication along the spinal column's prime neurological pathway.

Currently available lumbar supports significantly impede the flow of neurological communication along the spinal column. The way existing lumbar supports impede energy flow is that they provide transverse (horizontal) support(s) that presses against and is/are perpendicular to the vertical neurological back pathway of the spine. Thus, existing lumbar supports exacerbate the natural ill effects encountered in the sitting position.

Typical horizontal lumbar supports can cause discomfort during sitting by applying external transverse pressure against the back and on the Spinous processes. Sitting against typical transverse lumbar back supports also impedes the vertical physiological functions along the primary neurological pathway of the spinal column.

Figure 8:
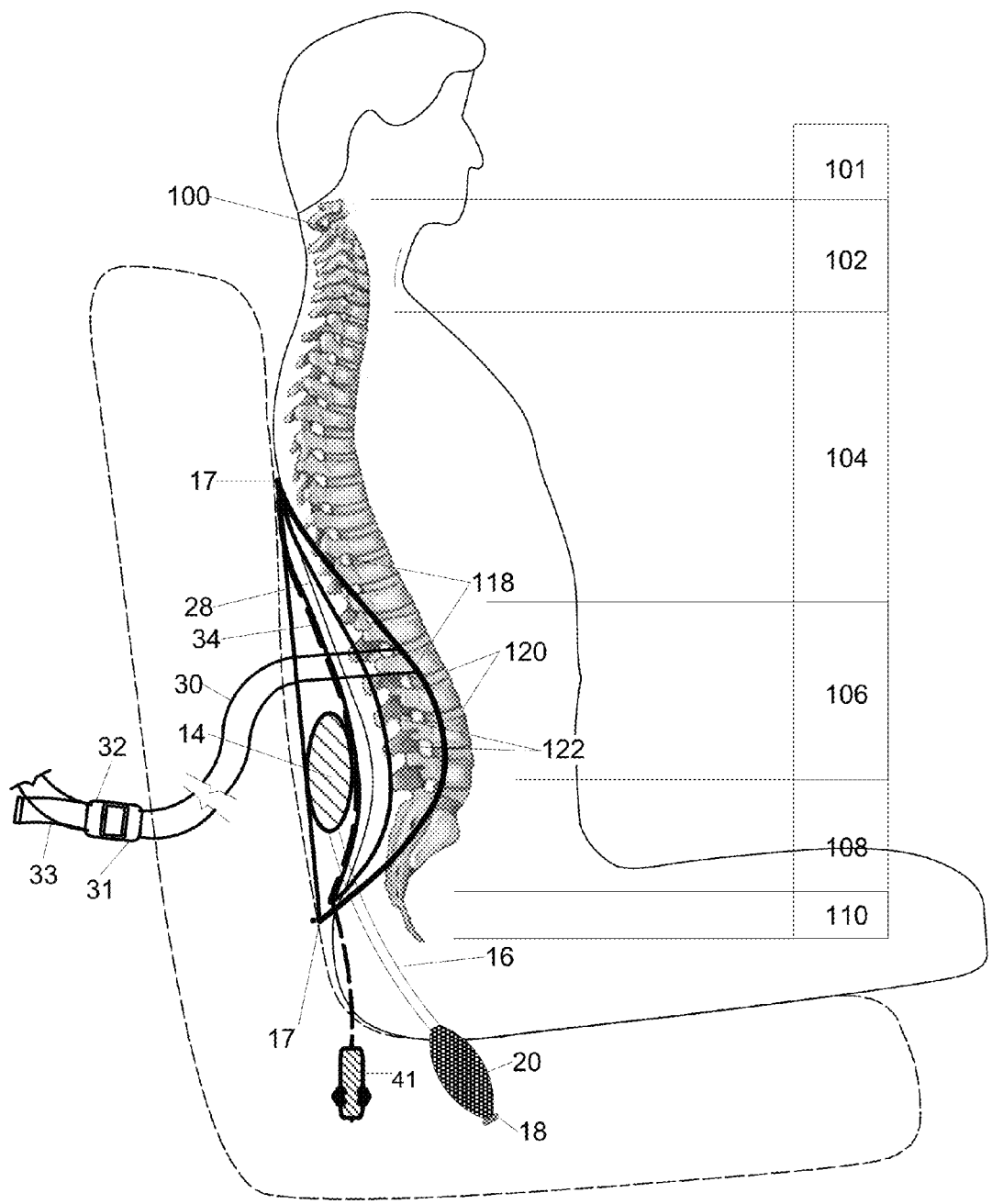
FIG. 8 is a lateral view of a portable embodiment illustrating the correct application against a seat back and the manner by which it supports the relevant portions of the spinal column of a seated person to achieve optimum lateral spinal alignment of the spine as illustrated in the Figure.
Figure 9:
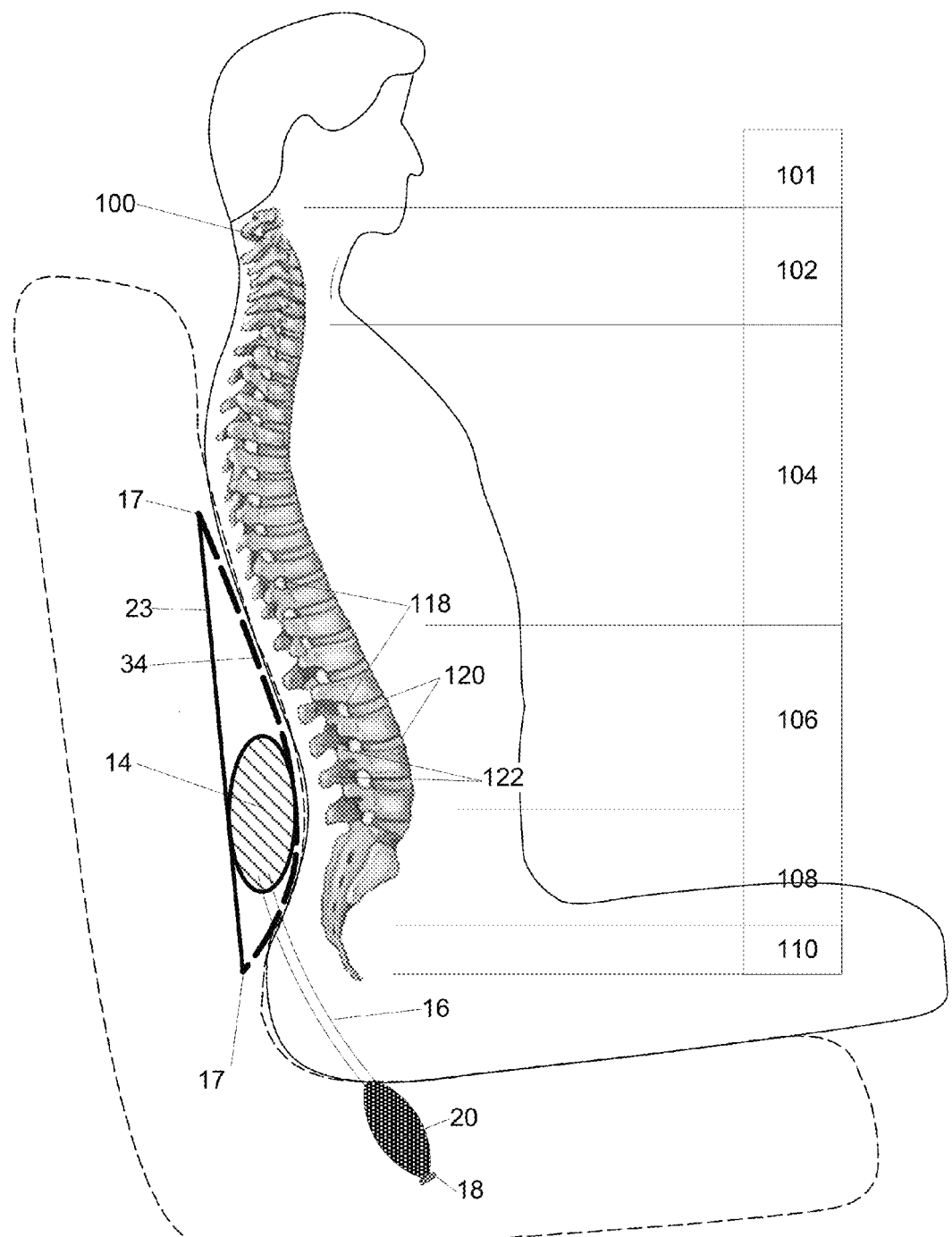
FIG. 9 is a lateral view of a permanently installed version illustrating the correct placement inside a seat back and the manner by which it supports the relevant portions of the spinal column of a seated person to achieve optimum lateral spinal alignment of the spine as illustrated in the Figure.
Figure 11:
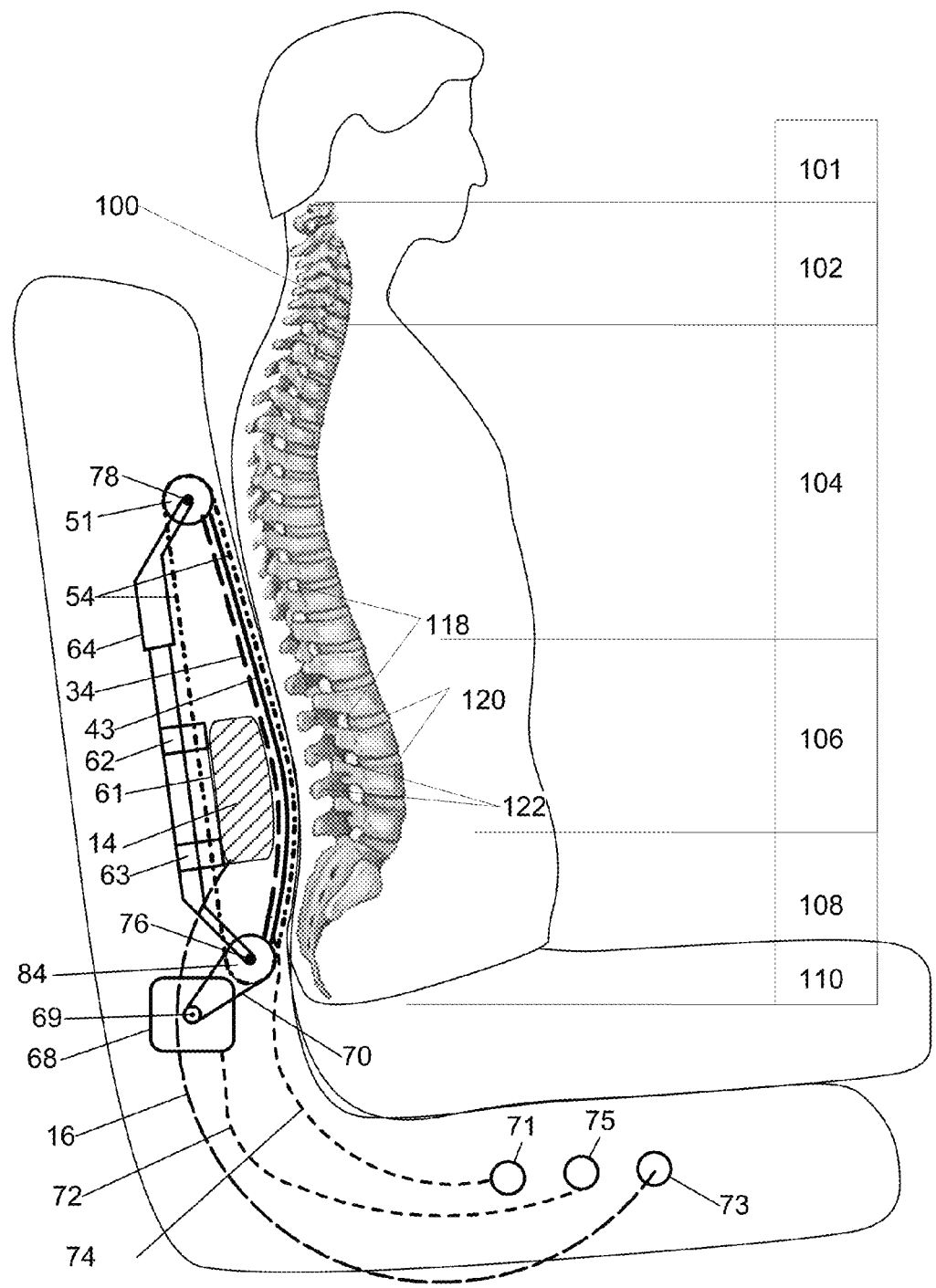
FIG. 11 is a lateral view of a permanently installed version of the embodiment juxtaposed with the outline of a seated person and the manner by which it supports the relevant portions of the spinal column of a seated person to achieve optimum lateral spinal alignment of the spine as illustrated in the Figure.

Improper alignment of the spinal column, either from the anterior/posterior view or the lateral (side) view, causes a degree of subluxation that impedes neurological communication throughout the body. Optimum posture for the spine consists of a series of reverse compound or serpentine curves as shown in FIGS. 8,9,11. No current back support devices, including chairs, seats, and furniture properly align the spinal vertebrae both from a lateral (side) view and from an anterior/posterior view in the optimum posture as shown in the Figures.

3. How this Embodiment Mitigates Human Health and Performance Problems

This embodiment helps mitigate one of the most common ailments of humankind; lower back pain. On a broader scale this embodiment mitigates a wide variety of human health & performance problems including, but not limited to, physical fatigue, mental sluggishness, and stiffness from sitting, poor circulation, back pain and low energy, by providing primary support of the human back utilizing vertical components arranged in two columns conforming to the Erector spinae muscles. It also provides an open channel so that the primary neurological pathway along the spinal column functions optimally and unimpeded by transverse components pressing against the back. The vertical components can be adjusted to optimally align the spine from a lateral (side) view, which promotes optimum health and performance. Some of the vertical components also support, warm, cool, and massage the back. The combined effect of these technologies mitigates physical problems and improves performance.

This embodiment uses no transverse components against the back that impede vertical flow of neurological signals and cellular transfer. Its vertical components with the open channel facilitate natural vertical flow of neurological signals and cellular transfer. Additionally, it improves posture, promotes optimum anatomical alignment of the spinal column, reduces subluxation, opens up vital neurological pathways, and thus improves health and human performance.

Embodiments can exist in portable versions and permanently installed versions. Applications include the following seat backrests, back support and back carrying devices, including but not limited to, household furniture, office seating, vehicles, aircraft, boats, ships and backpacks. Thus, this embodiment mitigates human health and performance problems in many human endeavors.

DETAILED DESCRIPTION c) Figures

First Embodiment

FIGS. 1,3

One embodiment is portable and has vertical components 36,28 that support the back and conform to Erector spinae muscles 124 on both sides of the spinal column 100, which form open channel 24 between them which channel aligns with the spinal column 100. Vertical components that align the spine improve foramen 118 openings and intervertebral disk 120 spacing. Right rear strap 22 and left rear strap 13 are non-stretch tension components that hold frame 17 in a curved position. These straps can be made of polyester, nylon or any non-stretch material. Right vertical conforming layer 28 and left vertical conforming layer 36 can be made with materials such as poly-vinyl chloride foam or acrylonitrile butadiene styrene. Vertical components 36,28,13,22 attach to the top and the bottom of frame 17. The frame can be made of materials such as steel or plastic composite. Frame 17 supports connected polyester, nylon or other stretchable material 26 secured by finished edging 25. Right vertical conforming layer envelope 45, left vertical conforming layer envelope 35 encase right vertical conforming layer 28 and left vertical conforming layer 36.

Operation—FIGS. 1, 2, 3, 4, 5, 6, 7, 8, 9, 10, 11, 12

Operate the portable version of this embodiment FIGS. 1, 2, 3, 4, 5, 6, 7, 8 by positioning it between the human back and a seat back. Wrap left belt 33 around left side of seatback and wrap right belt 30 around right side of seat back and secure with right buckle 31 and left buckle 32, then tighten belts to secure device to seatback. The frame 17 wraps around the medial sides of the back in the lumbar region and centers the back in the embodiment so that vertical components 36&28 conform with the Erector spinae muscles 124 located on both sides of the spinal column 100 such that channel 24 aligns with spinous processes 122 and thus removes any external pressure against them. Adjust position of vertical components against back by inflating or deflating lateral pressure adjusting device 14. Regulate PSI in device by compressing pump 20, delivered through tube 16 with control valve 18. Lateral pressure adjusting device 14 is encased in lateral pressure adjusting device envelope 15. Lateral pressure adjusting device 14 expands between non-stretch left rear strap 13 and right rear strap 22 and right vertical pressure distributing layer 34 and left vertical pressure distributing layer 38 to laterally adjust right vertical conforming layer 28 and left vertical conforming layer 36 to support back and improve posture of spinal column 100 which improves foramen 118 openings and intervertebral disk 120 spacing. Insert DC plug 41 into vehicle power outlet to warm right vertical heating layer 46 and left vertical heating layer 40. Right vertical stimulating layer 44 and left vertical stimulating layer 42 require no operation per se as they are electro-magnetic layers constructed with either spots or continuous electro-magnetic components embedded in the layer that continuously give off stimulation from the electromagnetic spectrum.

Operate one permanently installed version of this embodiment FIG. 9 using pump 20, control valve 18 and tube 16 inflate or deflate lateral pressure adjusting device 14.

Figure 10:
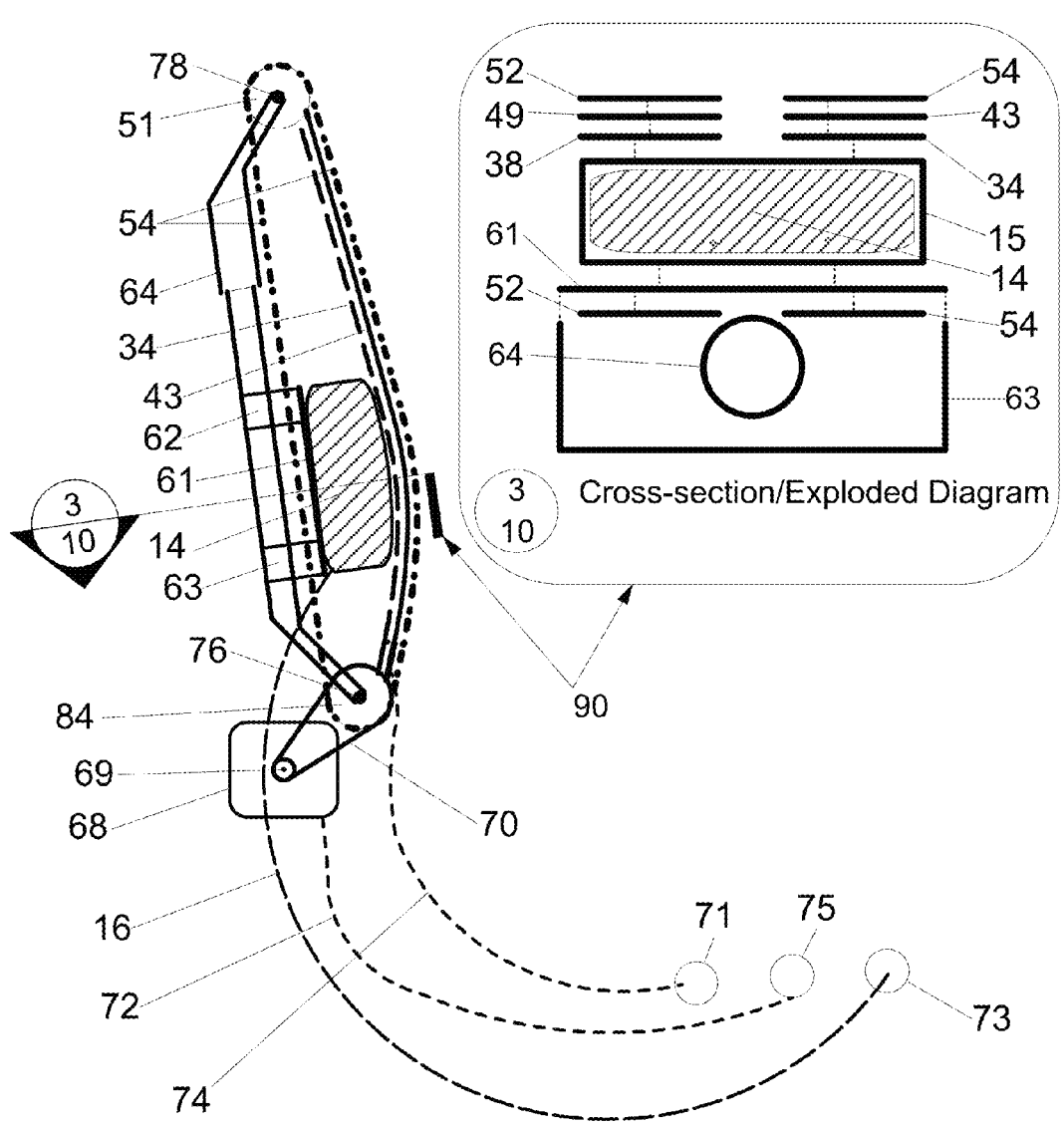
FIG. 10 is a lateral view of another permanently installed version of the embodiment showing assembly of mechanical components, control devices, and a cross-section/exploded diagram of the components of the embodiment.
Figure 12:
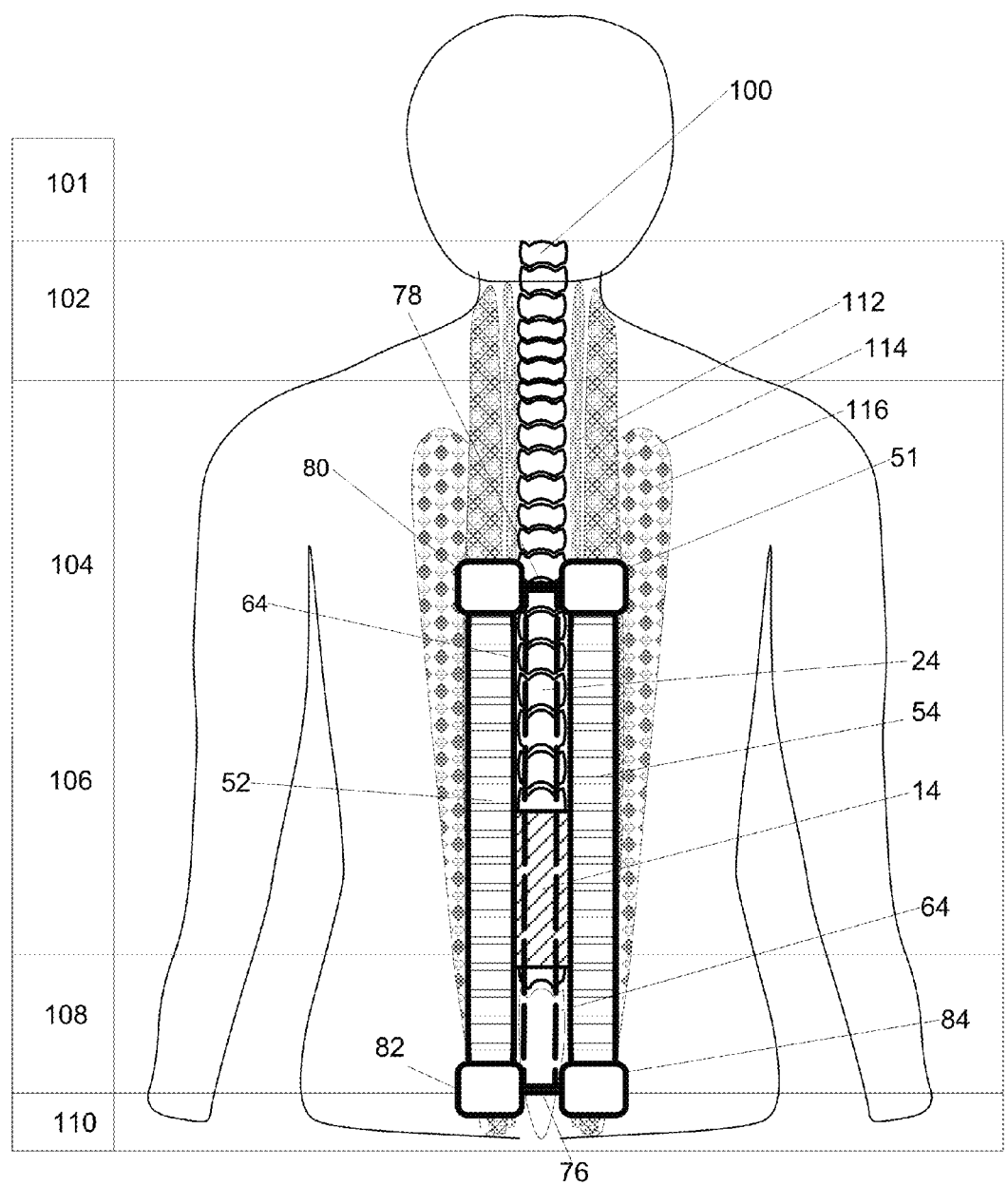
FIG. 12 is a posterior view of a permanently installed version of the embodiment superimposed on the outline of the back and the manner by which it supports the relevant portions of the spinal column of a seated person to achieve optimum anterior/posterior spinal alignment of the spine as illustrated in the Figure.

Operate another permanently installed version of this embodiment FIGS. 10, 11, 12 using toggle button 73 to inflate or deflate lateral pressure adjusting device 14 via tube 16 to inflate or deflate lateral pressure-adjusting device 14. Operate right vertical heating layer/massage belt slip surface 43 and left vertical heating layer/massage belt slip surface 49 via control wire 74 and button 71. Operate right massage belt 54 and left massage belt 52 by pressing button 75 to activate motor 68 via wire 72. Piston mechanism 64 is spring loaded and compresses to compensate when lateral pressure-adjusting device 14 expands which repositions left massage belt 52 and right massage belt 54 and shortens distance between upper pulley shaft 78 and lower pulley shaft 76. Pressure adjusting device 14 presses against rear pressure plate 61 connected to piston mechanism 64 by bottom support arm 63 and top support arm 62 and, against right vertical pressure distributing layer 34 and left vertical pressure distributing layer 38. Right massage belt 54 rotates around right top pulley 51 and right bottom pulley 84 and slides on right vertical heating layer/massage belt slip surface 43. Left massage belt 52 rotates around left top pulley 80 and left bottom pulley 82 and slides on left vertical heating layer/massage belt slip surface 49. Right bottom pulley 84 and left bottom pulley 82 are driven by belt that rotates on motor pulley 69 driven by electric motor 68 controlled by electrical supply 72 with motor control button 75. Right top pulley 51 and left top pulley 80 rotates on upper pulley shaft 78. Right bottom pulley 84 and left bottom pulley 82 rotates on lower pulley shaft 76.

Additional Embodiments

FIGS. 2, 4, 5, 6, 8

Figure 5:
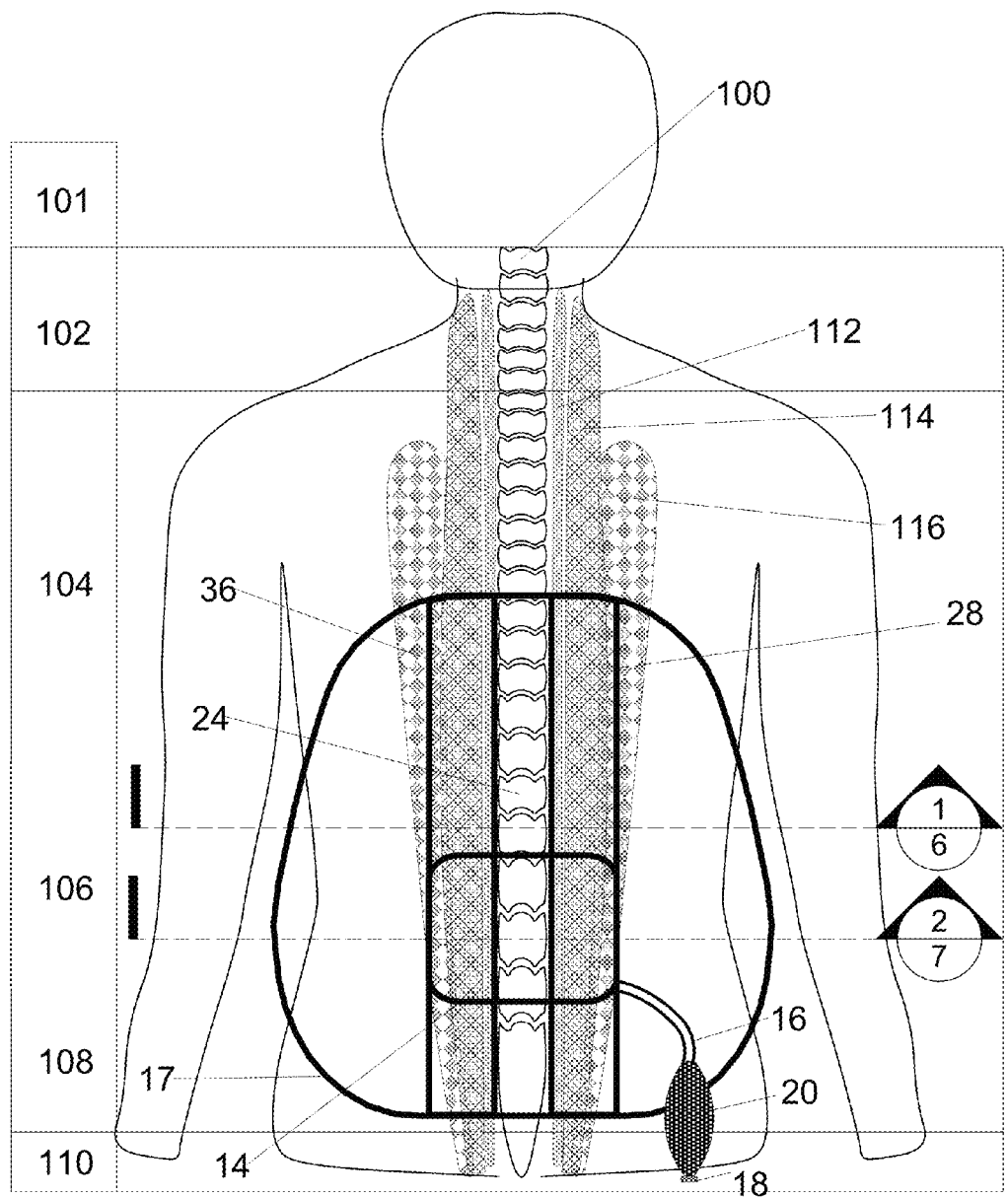
FIG. 5 is a posterior view of a portable embodiment outlined and superimposed on an outline of a human torso with relevant anatomy identified with which the embodiment works, and location of the two cross-section views.
Figure 6:
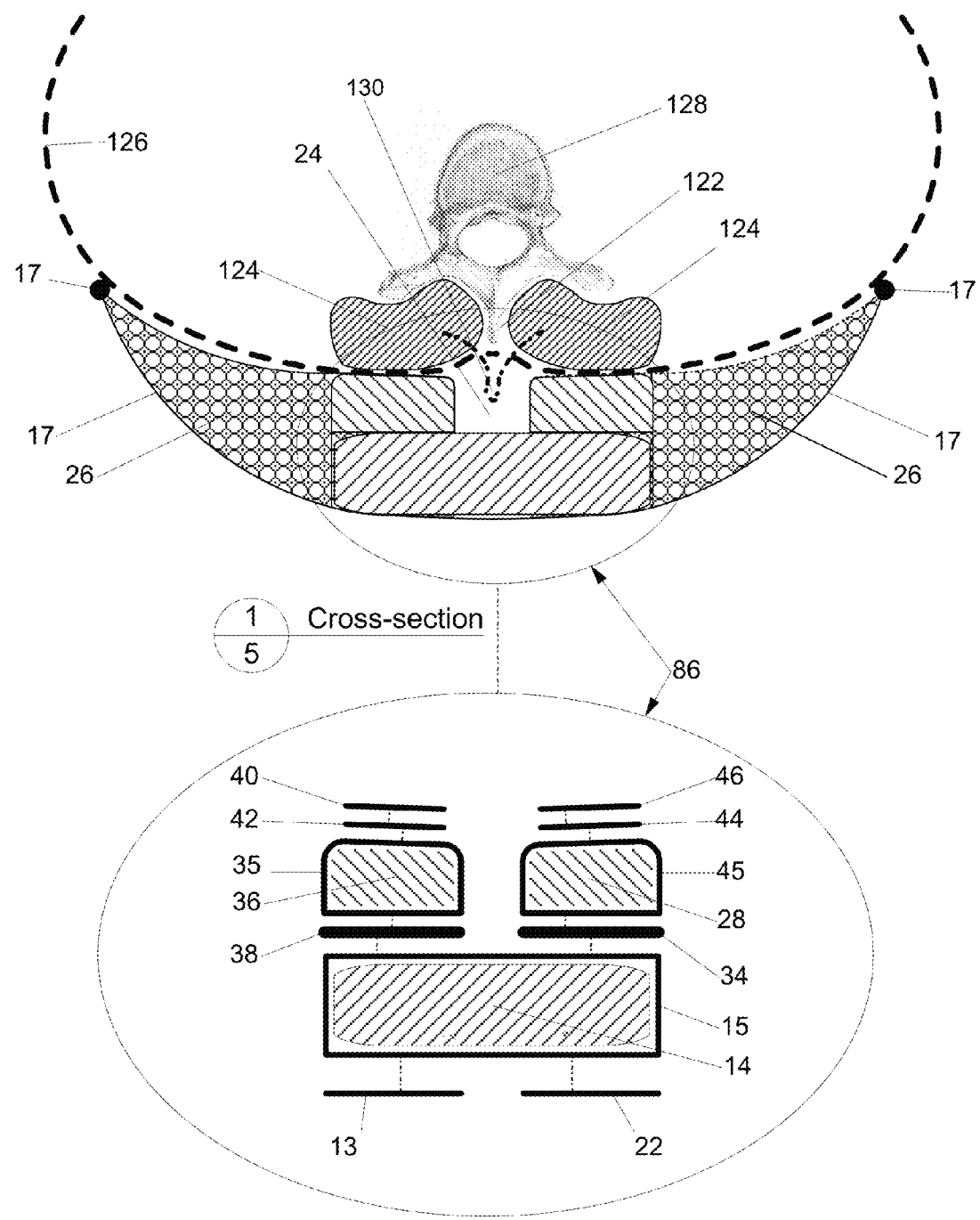
FIG. 6 is cross-section view #1 as identified in FIG. 5 of a portable embodiment that shows an outline of the human back and relevant anatomy, the frame with stretchable material, all of the vertical components in the exploded view and the lateral pressure-adjusting device.
Figure 7:
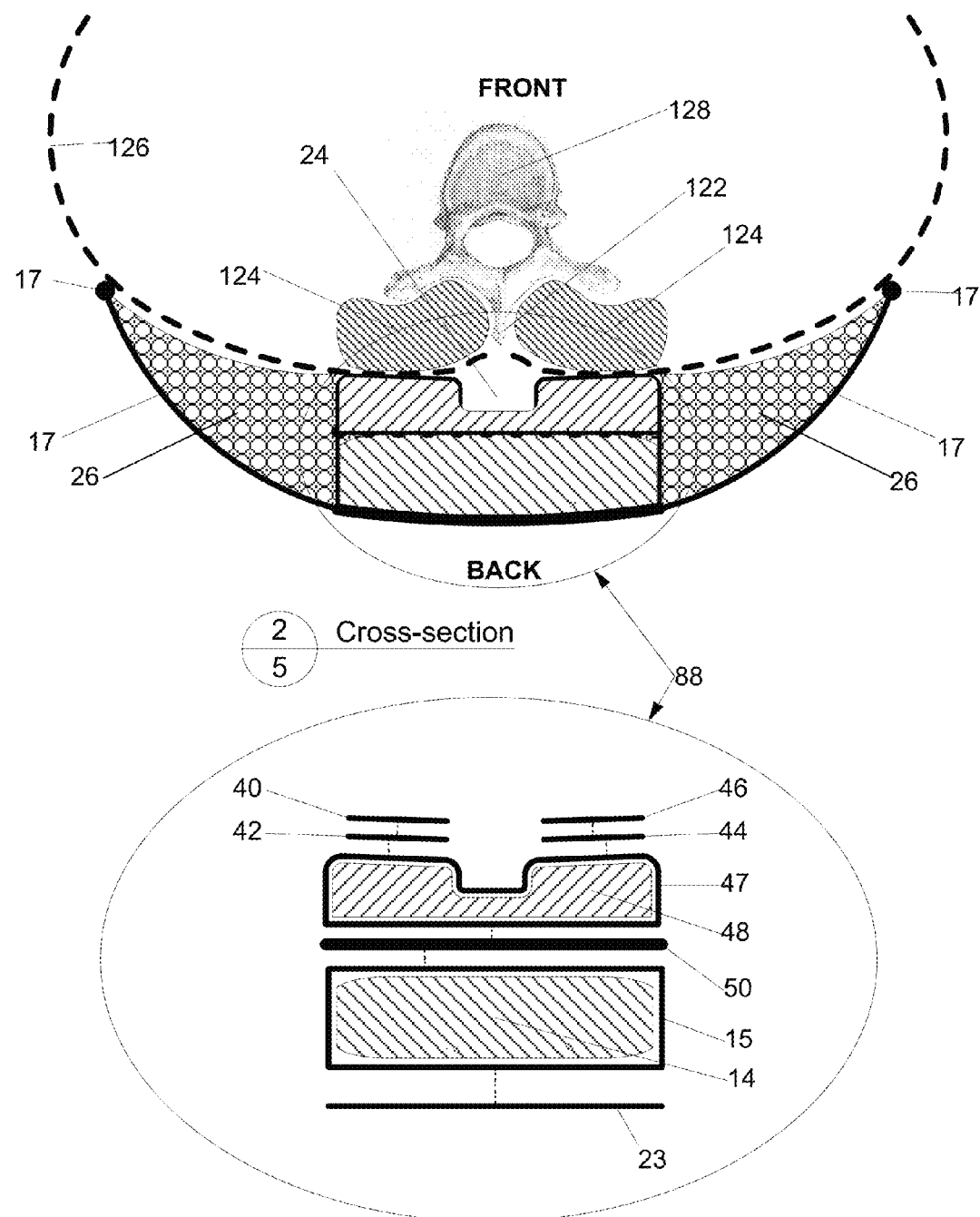
FIG. 7 is cross-section view #2 as identified in FIG. 5. of a portable embodiment that shows an outline of the human back and relevant anatomy, the frame with stretchable material, all of the vertical components (except that the left and right vertical conforming layers are replaced with one wider vertical conforming layer), all of the vertical components in the exploded view and the lateral pressure-adjusting device.

Additional embodiments of the portable version of the embodiment include the following components: a right vertical pressure distributing layer 34 and a left vertical pressure distributing layer 38, a right belt 30, a left belt 33 of such material as polyester, polypropylene, or nylon, a right buckle 31 and a left buckle 32 of such material as plastic polymers, a lateral pressure adjusting device 14, a tube 16, a pump 20, a control valve 18, a right stimulating layer 44, a left stimulating layer 42, a right vertical heating layer 46, a left vertical heating layer 40 and a DC plug 41. FIG. 5 shows cross-section 1 illustrated on FIG. 6 and cross-section 2 illustrated on FIG. 7. Cross-section 1&2 illustrate the embodiment in relation to the outline of the human back 126, the Erector spinae muscles 124 and the vertebra cross-section 128. FIG. 7 dashed outline in channel 24 illustrates spinous process-alternate position 130 which position may occur contingent on various anatomy, compression of Erector spinae muscles and compression of right vertical conforming layer 28 and left vertical conforming layer 36 or single vertical notched conforming layer 48. Exploded diagram 86 shows components of cross-section 1. Exploded diagram 88 shows components of cross-section 2. Exploded diagram 90 shows components of cross-section 3. FIG. 5 also illustrates vertebral categories 101, which are cervical vertebrae 102, thoracic vertebrae 104, lumbar vertebrae 106, sacral vertebrae 108 and coccyx vertebrae 110, and this embodiment in relation to these sections of the vertebral column 100.

Alternative Embodiments

FIG. 7, 9

One alternative portable embodiment is the similar to the First Embodiment of a portable version except it utilizes a single vertical notched conforming layer 48 in lieu of right vertical conforming layer 28 and left vertical conforming layers 36 and a single vertical pressure-distributing layer 50, which is wrapped in single vertical conforming layer envelope 47, and a single center rear strap 23 in lieu of right rear strap 22 and left rear strap 13.

Another alternative embodiment is a permanently installed version as shown in FIG. 9 installed permanently inside a seatback illustrating its relationship to optimum lateral spinal alignment. Pump 20 adjusts device.

A second alternative embodiment of a permanently installed alternative is shown in FIG. 10, 11, 12. This version has many additional features and user conveniences. FIG. 10 shows a side view and Cross-section 3/exploded diagram 90 of this version. FIGS. 10, 12 show right massage belt 54 that rotates on right top pulley 51 which rotates on upper pulley shaft 78, and on a right bottom pulley 84 which rotates on lower pulley shaft 76. A left massage belt 52 rotates on left top pulley 80, which rotates on upper pulley shaft 78, and on a left bottom pulley 82 that rotates on lower pulley shaft 76. Lateral pressure adjusting device 14 is encased in lateral pressure adjusting device envelope 15. Lateral pressure adjusting device 14 is controlled by lateral pressure adjusting device button 73 via tube 16. Right vertical heating layer/massage belt slip surface 43 and left vertical heating layer/massage belt slip surface 49 are stationary. Right vertical pressure distributing layer 34 and left vertical pressure distributing layer 38 distribute pressure from lateral pressure adjusting device 14. Pressure plate 61 is connected via top support arm 62 and bottom support arm 63 to piston mechanism 64. Motor 68 drives belt 70, which rotates right massage belt 54 and left massage belt 52. Motor control button 75 controls motor 68 via motor power wire 72. Heat control button 71 sends electrical current via heat layer wire 74 to right vertical heating layer/massage belt slip surface 43 and left vertical heating layer/massage belt slip surface 49.

FIG. 11 shows a lateral view of this embodiment permanently installed inside a seat back and its anatomical relationship with a seated person, especially with the spinal column shown in optimum serpentine alignment with optimum foramen openings and intervertebral disk spacing. FIG. 12 shows a posterior view of this embodiment superimposed on a human torso and its anatomical relationship with the spinal column 100, the spinalis muscle 112, the longissimus muscle 114, and the illiocostalis muscle 116; together, these three muscles are referred to as the Erector spinae 124.

Advantages

From the description above a number of advantages of the several embodiments, become evident:
1. Mitigates one of the most common ailments of humankind; lower back pain.
2. Improves mental acuity and blood circulation, increases energy to perform at optimum levels.
3. Improves spinal alignment utilizing vertical components arranged in two columns that generally conform to the erector spinae muscles, which provide primary support of the back, and create an open channel in between into which spinous processes can project without contacting any hard or discomforting element, thus increasing the comfort of leaning your back against a hard or rigid backrest.
4. Enhances health by enabling unimpeded neurological communication through this open channel that facilitates physiological functions occurring within the energy field of the human aura.
5. Enhances health by improving anatomical posture and by facilitating physiological functions.
6. Accomplishes better back support and enhanced health by not using any transverse components that impede neurological communication along the spinal pathway.
7. Returns energy back to users; energy in the form of bioelectric, biochemical, neurological communication, cellular flow and nutrient distribution. This energy is normally restricted by typical back supports utilizing transverse components pressing directly against the back or by uncomfortable hard and/or concave backrests, all of which restrict energy flow.
8. Improves spinal alignment, which can create improved intervertebral disk spacing and foramen openings that facilitate physiological functions.
9. Facilitates neurological communication along the primary electro-chemical pathway of the spine.
10. Increases mental alertness due to improved physiological functioning.
11. Reduces fatigue and increases productivity especially while performing long-duration seated tasks.
12. Both portable and permanently installed versions of this embodiment increase mental awareness of environmental cues while performing various tasks such as operating vehicles of all types (cars, trucks, planes, trains, busses, boats, ships etc.) and remote controlling objects like drones.
13. Enables users to improve health and performance in many different venues, including but not limited to, sitting at home, in the office, on park benches, and in vehicles of all types by easily carrying the portable embodiment to wherever people choose to lean against a backrest.
14. Allows integration of this technology into backpacks of all types wherein the load is made to feel lighter due to improved anatomical alignment, physiological functions and increased energy to perform.
15. Allows adaptation of this technology into weightlifting devices by using a forward facing cinching belt.
16. Cools the back via the open channel through convection currents.
17. Warms the back using a heating element.
18. Massages the back, soothes muscles and stimulates blood flow utilizing a circulating ribbed belt.
19. Improves physiological functions utilizing electro-magnetic components, which, according to some health professionals, facilitate healing and circulation.

CONCLUSION, RAMIFICATION AND SCOPE

The reader will see that this embodiment is a unique method of providing primary support of the back utilizing vertical components arranged in two columns positioned on both sides of the spinal column conforming to the Erector spinae muscles in the thoracic, lumbar, and sacral regions of the spine. It accomplishes this support without any transverse components that apply pressure across and against the spinous processes of the spinal column. No transverse components exist adjacent to the back that can impede neurological communication and cellular flow along the spinal column. This embodiment creates an open channel between the vertical components that facilitates physiological functions. This longitudinal indentation is also a space where spinous processes are protected from external physical pressure.

The embodiment has several applications in both portable and permanent configurations.

Although the description above contains much specificity, these should not be construed as limiting the scope of the embodiments but as merely providing illustrations of some of the presently preferred embodiments. For example, the technology in the back support device can be applied to exterior permanently installed surfaces. Its shape and frame containment can be embodied in various configurations and applications.

Thus, the scope of the embodiments should be determined by the appended claims and their legal equivalents, rather than by the examples given.

We claim:

1. A back support device to provide support to a user, comprising:
   a supporting frame structure of rigid or semi-flexible material, the supporting frame structure having at least a top and a bottom, the supporting structure adapted to be portable and removeably attached to a backrest or permanently installed in or on a backrest;
   a plurality of vertical components layered in two vertical columns arranged in a laterally, spaced apart position and connected to the top and bottom of the supporting frame structure, the two vertical columns of layered vertical components adapted to align with and shaped to conform and support the erector spinae muscles and provide primary support of the back in the thoracic, lumbar, and sacral vertebrae regions of the spine;
   wherein the vertical components are fabricated from a single one-piece unitary vertical component that is notched to form a central U-shaped vertical channel;
   an open side of the central vertical U-shaped channel being adjacent to a user's back, the central vertical U-shaped channel and the vertical components configured to allow spinous processes to intrude and be protected from external pressure,
   material extending across and secured to the supporting frame structure, the material allowing ventilation to the central U-shaped vertical channel;
   fasteners connected to the portable back support device for securing the portable back support device to a seat back,
   wherein the back support device and central U-shaped vertical channel is an open conduit that facilitates physiological functions including unimpeded neurological communication along the spinal pathway, optimally aligning the spine, improving rib head articulation, optimizing intervertebral disk spacing, optimizing foramina openings, improving neurological communication along the spinal pathway, enhancing health, increasing performance, and returning energy to the user.

2. The back support device of claim 1, wherein the vertical components have a lateral shape, the lateral shape being adjustable by a lateral pressure adjusting device located behind the vertical components so that it aligns with a user's lumbar region of the spinal column to separate and prevent transverse or continuous components from contacting the back.

3. The back support device of 2, wherein the vertical components include one or more pressure distributing layers that flex upon pressure from the lateral pressure adjusting device to redistribute pressure along the length of other the vertical components.

4. The back support device of claim 1, wherein the vertical components include vertical electrical heating layers for warming the back of a user.

5. The back support device of claim 1, wherein the vertical components include a layer of electromagnetic elements for stimulating circulation and soothing muscles.

6. The back support device of claim 1, wherein the vertical components in the permanently installed back support device include rotating ribbed belts that massage the erector spinae muscles vertically.

7. The back support device of 1 wherein the supporting structure includes fabric or other material covering that forms a flexible surface that supports and works synergistically with the support frame structure and the vertical components.

8. The back support device of claim 1, wherein the back support device is constructed in various heights, widths, and depths to accommodate a wide range of torso sizes from infant to adult.

9. The back support device of claim 1 wherein the fasteners are adjustable straps for firmly holding the portable back support device in place when secured to a backrest of a chair or seat.

* * * * *